United States Patent [19]

Han

[11] Patent Number: 5,392,352
[45] Date of Patent: Feb. 21, 1995

[54] SCRAMBLE DETECTING CIRCUIT IN A SATELLITE BROADCASTING RECEIVER AND SCRAMBLE DETECTING METHOD

[75] Inventor: Hong-Soo Han, Ahnyang, Rep. of Korea

[73] Assignee: Samsung Electronics Co., Ltd., Kyungki, Rep. of Korea

[21] Appl. No.: 52,142

[22] Filed: Apr. 26, 1993

[30] Foreign Application Priority Data

Apr. 24, 1992 [KR] Rep. of Korea ............... 6957/1992

[51] Int. Cl.⁶ ........................................... H04L 9/00
[52] U.S. Cl. ...................................... 380/10; 380/9; 380/19; 380/49; 380/59
[58] Field of Search ............... 380/2, 9, 10, 19, 20, 380/49, 59; 360/46

[56] References Cited

U.S. PATENT DOCUMENTS

4,672,440  6/1987  Trahan ........................ 380/20 X
5,122,912  6/1992  Kanota et al. ................... 360/46

Primary Examiner—Bernarr E. Gregory
Attorney, Agent, or Firm—Sughrue, Mion, Zinn, Macpeak & Seas

[57] ABSTRACT

In a satellite broadcasting receiver for receiving and decoding pulse code modulation (PCM) audio frame data having a plurality of channels, the logical state of charged flags (FD) included in the data of each channel is detected and the charged flags detected at a channel-related period are stored. Then the charged flags of a previous frame are simultaneously gated at the start time of a frame. A plurality of pulses clocking individual frame periods are counted and a multiframe signal spanning a given period is generated. In this case, the logical values of the charged flags gated at multiframe periods are accumulated, and an audio mute signal is generated when charged flags exceeding a given number are detected during a multiframe signal period.

16 Claims, 11 Drawing Sheets

SCRAMBLE DETECTING CIRCUIT IN A SATELLITE BROADCASTING RECEIVER AND SCRAMBLE DETECTING METHOD

BACKGROUND OF THE INVENTION

The present invention relates to a decoding device for decoding pulse code modulation (PCM) audio data in a satellite broadcasting receiver, and more particularly to a circuit capable of muting an audio signal upon determining the presence of scrambling during the decoding process of the received PCM audio data.

Generally, scrambling signifies that a frequency position is selected while synchronization is adjusted between counterpart devices in the communication system. In a scrambling communication system used for commercial satellite broadcast, a transmitting side limits the communication of a receiving side. Namely, a satellite broadcasting receiver subscriber must pay a fee in order to receive the scrambled signal. The scrambled signal sent from the transmitting side is reproduced at the receiving side by using descrambling techniques. In this case, a charged flag signal for giving notice that a transmitting signal is scrambled is inserted in a frame of the PCM audio data.

When receiving the scrambled signal through a satellite broadcasting receiver, an image signal is displayed in non-standard form and noise interferes with the audio signal. That is, whereas general audio data received from the satellite broadcasting receiver is reproduced with good tone quality, the scrambled audio data is reproduced with a tone harsh to the ear because of the noise. Therefore, if the scrambled PCM audio data is received by the satellite broadcasting receiver, it would be beneficial to check whether scrambling is present, and, if so, to mute the audio signal upon detection of the scramble.

SUMMARY OF THE INVENTION

Therefore, it is an object of the present invention to provide a circuit capable of muting the scrambled audio signal after detecting the presence of scrambling. The circuit operates by analyzing flag data in the received audio data frame while decoding the audio data received by the satellite broadcasting receiver.

It is another object of the present invention to provide a circuit for detecting charged flag bits for each channel within a frame period by analyzing the audio data received from the satellite broadcast receiver and for detecting the presence of scrambling by way of the charged flag bits detected during a given frame period.

In accordance with one aspect of the invention, the circuit for checking the presence/absence of scrambling is provided in a satellite broadcasting receiver that receives and decodes frame data having a plurality of channels of PCM audio data. The circuit determines whether scramble is present or not, and mutes the audio signal if and when the scrambled data is detected. The circuit includes a frame charged flag detecting means for receiving frame data, for sequentially detecting certain charged flags (e.g., by their logical state) included in the frame data of each of the plurality of channels, for simultaneously gating the detected charged flags at a corresponding channel period, and for generating a charged flag bit for each detected charged flag for each channel for every frame period. The circuit further includes multiframe signal generating means for receiving a clock signal corresponding to a frame period, for counting the received clock signals and for generating a multiframe signal corresponding to a given multiframe period. The circuit also includes determining means for receiving the charged flag bits and the multiframe signal, for accumulating the charged flag bits during the multiframe period and for generating an audio mute signal when the charged flag bits exceed a given number.

BRIEF DESCRIPTION OF THE DRAWINGS

For a better understanding of the invention and to show how the same may be carried into effect, reference will now be made, by way of example only, to the accompanying diagrammatic drawings, in which.

DESCRIPTION OF THE PREFERRED EMBODIMENTS

Figure 1A:
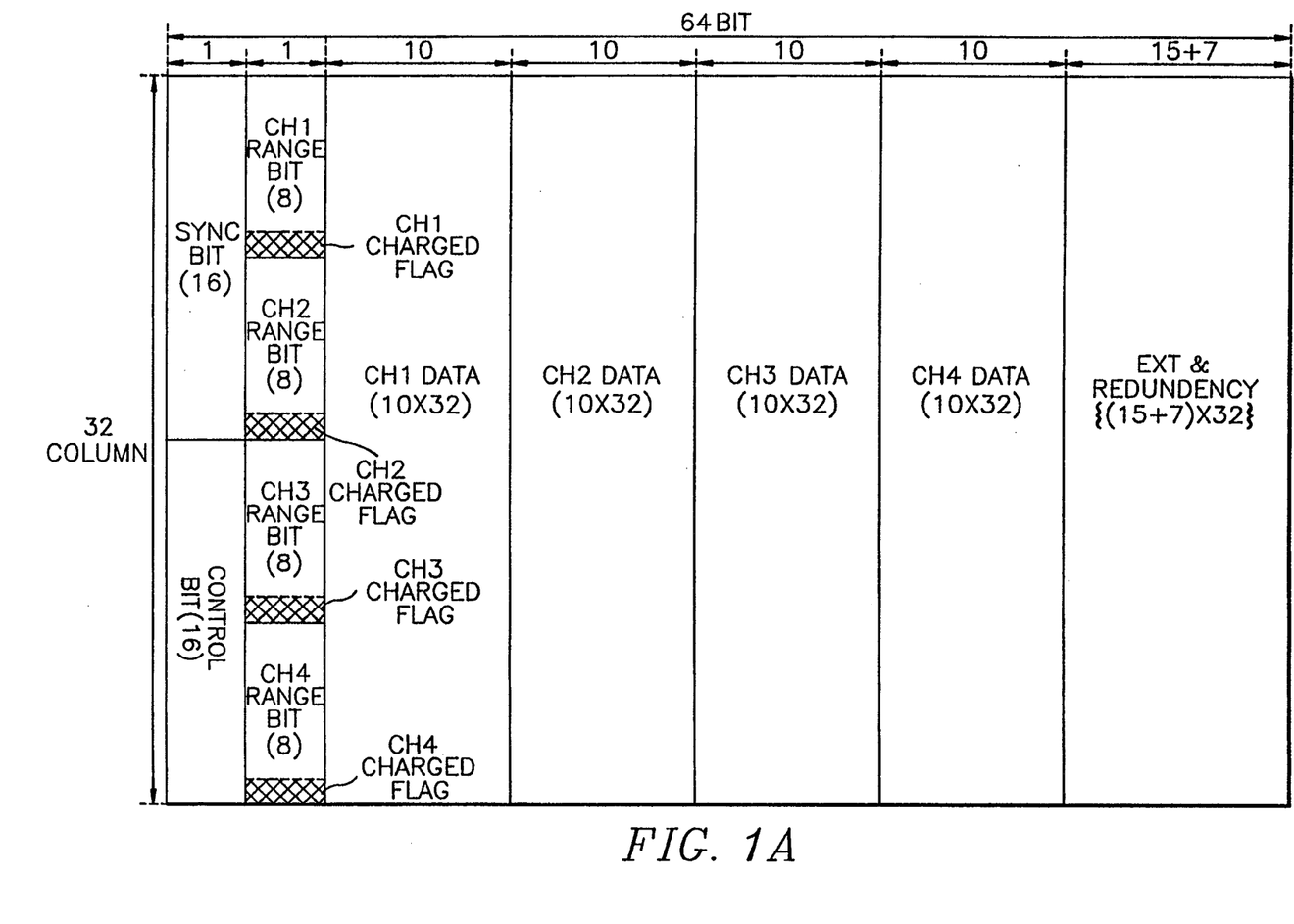
FIGS. 1A and 1B are diagrams illustrating the frame structure of PCM audio data in an A mode and a B mode, respectively.
Figure 1B:
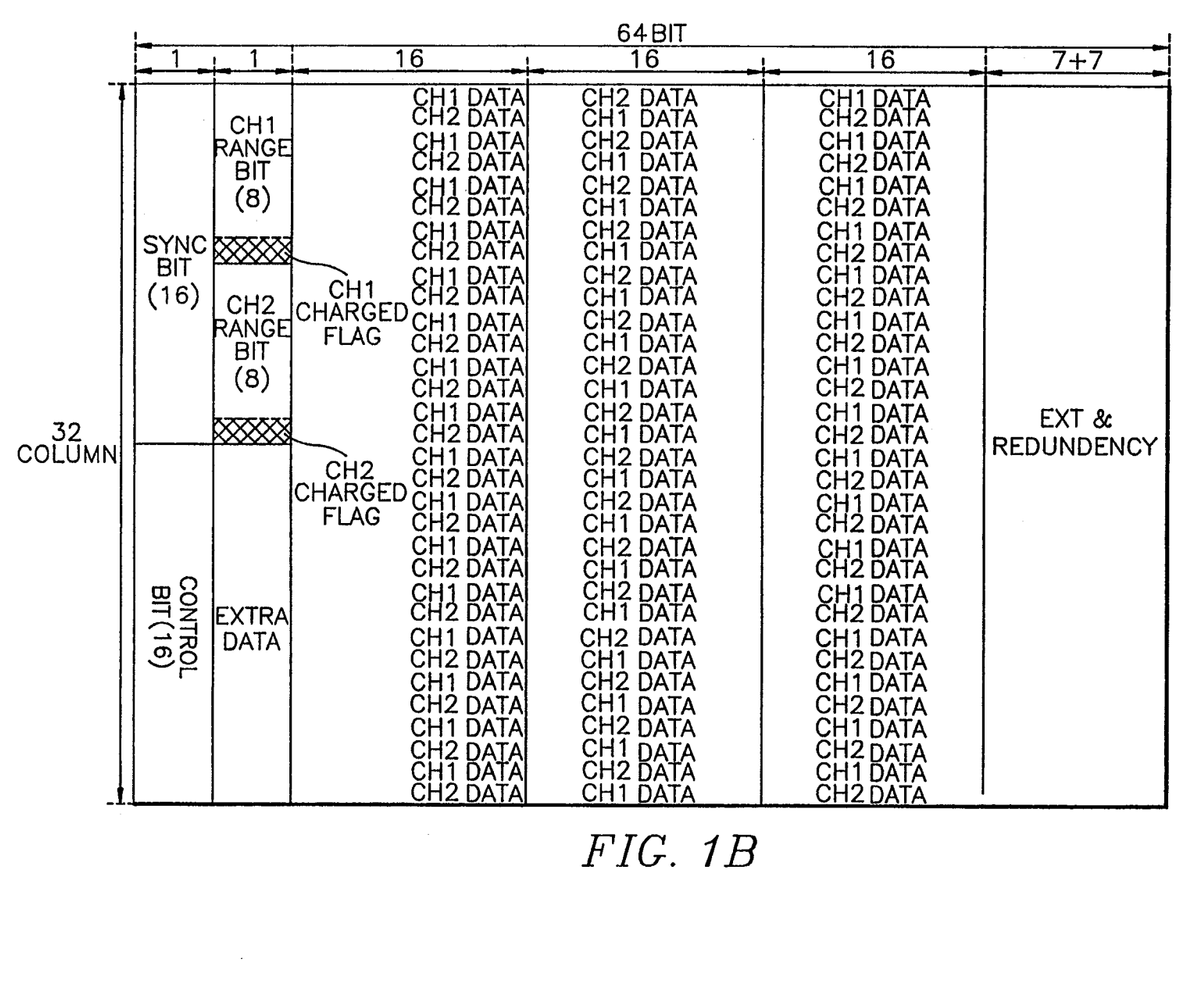

Referring to FIGS. 1A and 1B, there is shown one frame of PCM audio data interleaved from the transmitting side. One frame contains 2048 bits. FIG. 1A shows the frame structure of PCM audio data in an A mode (described in further detail hereinafter). The frame structure comprises audio data (2048 bits) of 32 columns, each column having 64 bits. These 64 bits in each column are sub-divided as follows: one bit is a sync bit or control bit, one bit is a range bit, 10 bits are audio data for each of four channels 1, 2, 3, 4, (40 bits total), 15 bits are independent data and 7 bits are parity bits for error correction. In a 2048 bit frame, 16 bits are sync bits. The sync bits reproduce a bit clock on the receiving side. The control bit signifies A mode versus B mode, television audio data, independent audio data, and whether audio data is compressed or not. As such, the receiving side controls the receiving audio state by checking the control bit. Control bits account for 16 bits in a frame. The range bits account for 32 bits subdivided into four channels, such that each channel comprises eight range bits. In the range bit for each channel, the first 3 bits are information bits corresponding to a range number, the next 4 bits are check bits for error correction and the eighth bit is the most significant bit (MSB) and is a charged flag bit indicating presence/absence of scramble. Data for each channel has 320 bits (10 bits×32 columns), data for channels 1 and 2 being stereophonic audio data for television. Data for channels 3 and 4 is independent audio data. The independent data contains 480 bits (15 bits×32 columns). The parity bits consist of 224 bits (7 bits×32 columns).

The frame data for the A mode, shown in FIG. 1A, is used when compressing audio data and then transmitting it. However, in the case of transmitting audio data of high tone quality such as music, it is desirable to send the PCM audio data without any compression. In this case, the frame data for the B mode, as indicated in FIG. 1B, is transmitted. The frame structure for the B mode also consists of 2048 bits per frame, with 32 columns each comprising 64 bits. The data for one column, comprising 64 bits, are partitioned as follows: one bit is a sync bit or control bit, one bit is either a range bit or independent data, 48 bits are audio data for channels, 7 bits are independent data, and 7 bits are parity bits for error correction. For frame data in the B mode, the audio data for the channels are alternatingly received. The audio data of each channel is original PCM audio data without audio compression. Since the audio data for two channels is received, the range bits total 16 bits (2 channels × 8 bits) in a 2048 bit frame.

Figure 2:
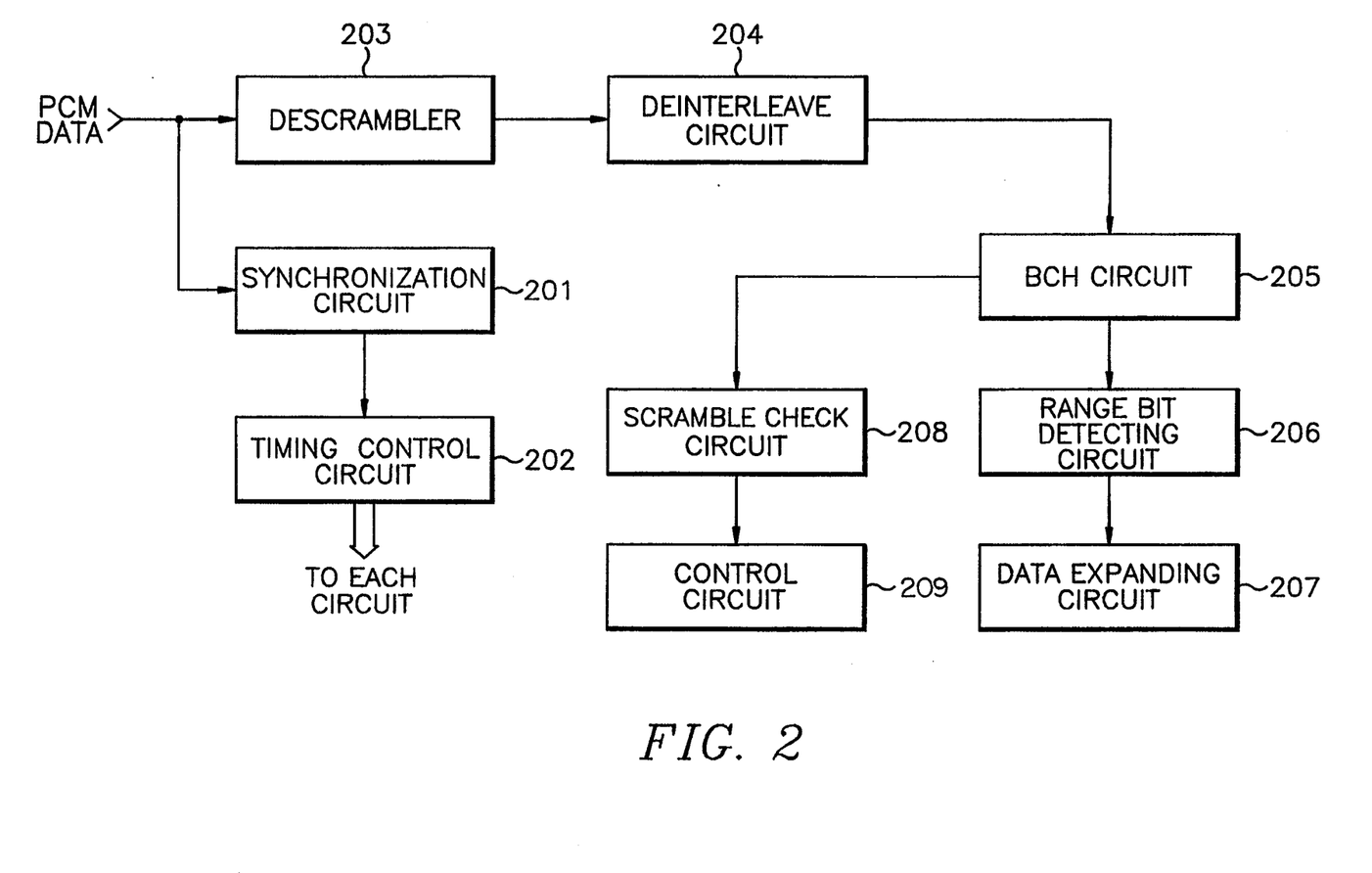
FIG. 2 is a block diagram illustrating a PCM decoding device for a satellite broadcasting receiver.

Referring to FIG. 2, a synchronization circuit 201 receives PCM audio data and detects synchronizing signals from the received frame data. A timing control circuit 202 receives the synchronizing signals generated from the synchronization circuit 201 and produces timing control signals for controlling operational timing at each of various other circuits. A descrambler 203 also receives the PCM audio data and randomizes signals in order to stabilize the received frame data. A deinterleave circuit 204 coupled to the descrambler 203 deinterleaves interleaved frame data to 32 bits, to distribute errors. A BCH (Bose-Chaudhuri-Hocquenghem) circuit 205 connected to the deinterleave circuit 204 checks the interleaved frame data in units of 64 bits to detect and correct errors. A range bit detecting circuit 206 connected to the BCH circuit 205 detects a range bit of each channel from the received frame data and analyzes the detected range bit to determine the compression state of the received audio data. A data expanding circuit 207 connected to the range bit detecting circuit 206 expands the compressed audio data to its original data bit range in response to the detected range bit. A charged flag determining circuit 208 coupled to the BCH circuit 205 receives the error corrected frame data and detects a charged flag bit of the MSB among the range bits of each channel for each frame period. In addition, the charged flag determining circuit 208 checks the logical state of the charged flag bits for each channel during a multiframe period and generates a mute control signal in response to the presence of scrambling. A control circuit 209 connected to the charged flag determining circuit 208 mutes the received audio data when the logic state of the mute control signal indicates scrambled frame data.

Figure 3:
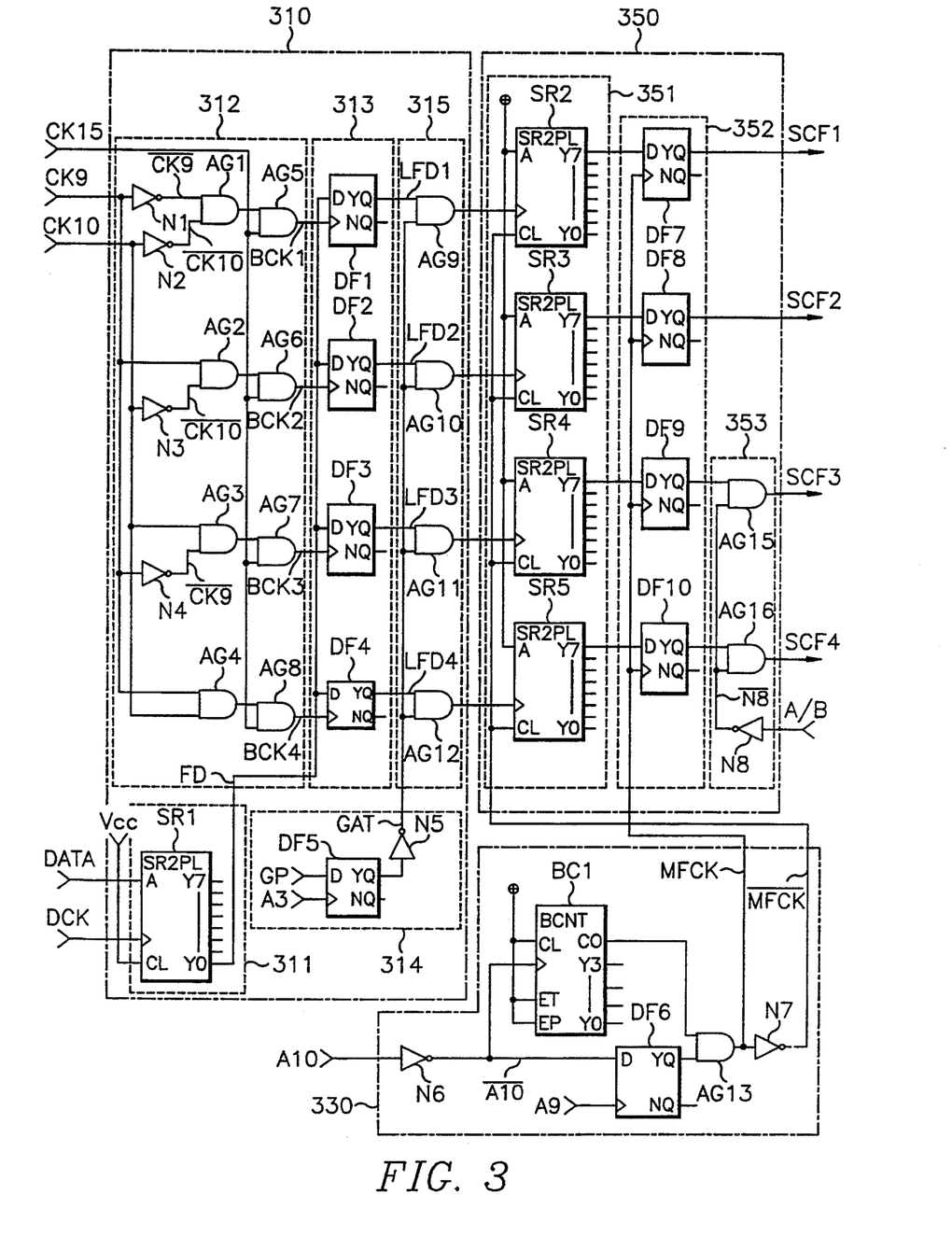
FIG. 3 is a circuit diagram illustrating a charged flag determining circuit in the scramble check circuit of FIG. 2 according to the present invention.

FIG. 3 shows a circuit diagram of the charged flag determining circuit 208 of FIG. 2. A frame charged flag detecting circuit 310 receives the frame data shown in FIG. 1A or 1B and detects the charged flag bit of each channel from the received frame data. Moreover, the frame charged flag detecting circuit 310 generates first to fourth bit clocks BCK1-BCK4 at a corresponding channel-related period by decoding each channel period sequentially. The circuit 310 then latches the detected charged flag bits sequentially in accordance with the first to fourth bit clocks BCK1-BCK4. Thereafter, the latched charged flags are gated periodically and charged flag bits LFD1-LFD4 for each channel are generated each frame period.

A multiframe signal generating circuit 330 receives a clock corresponding to a frame period and counts the received clocks to generate a multiframe signal MFCK corresponding to a given multi-frame period.

A scramble determining circuit 350 receives the charged flag bits LFD1-LFD4 and the multiframe signal and accumulates the logical states of the charge flag bits LFD1-LFD4 during the multiframe period. When charged flags exceeding a given number are detected, the frame data is determined to be scrambled and the scramble determining circuit 350 generates an audio mute signal.

The frame charged flag detecting circuit 310 includes a charged flag detecting circuit 311, a bit clock generating circuit 312, a charged flag latch circuit 313, a gating period determining circuit 314 and a gating circuit 315.

Figure 4:
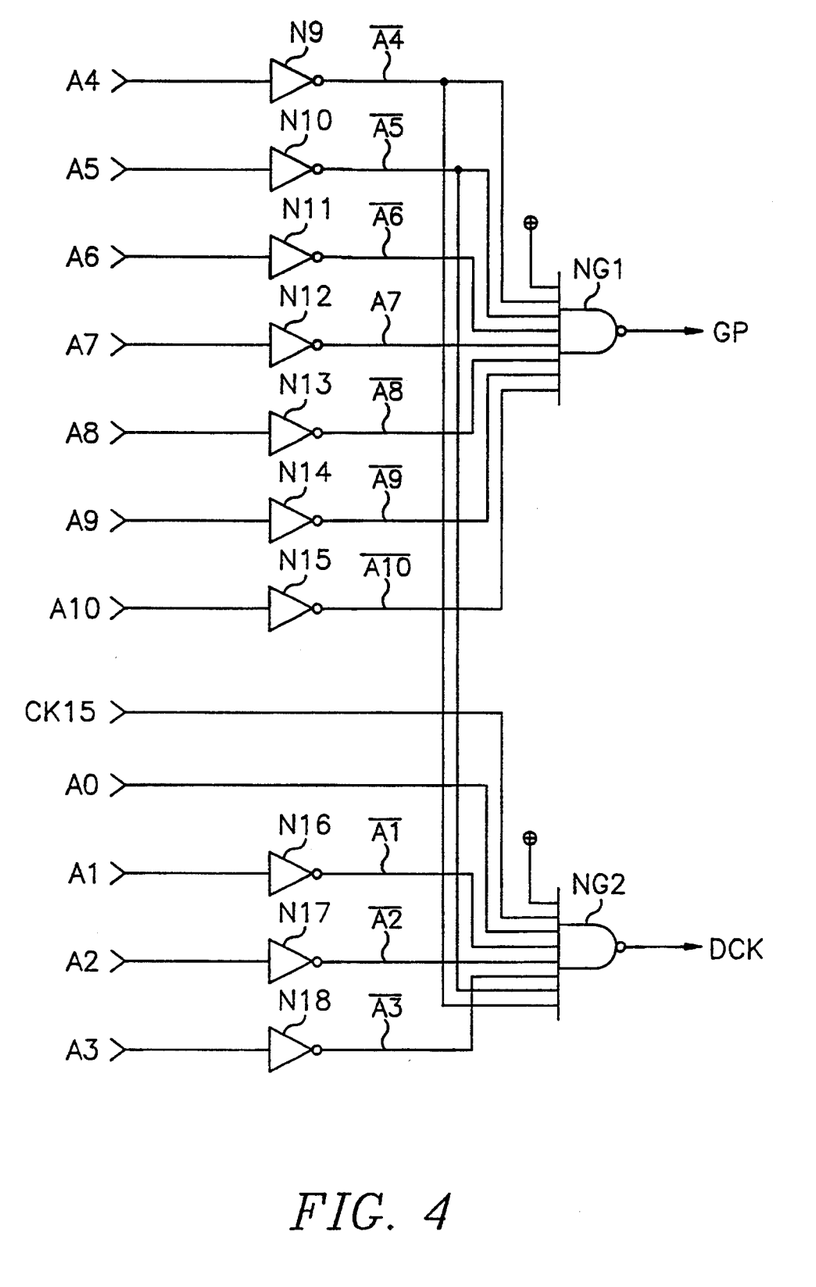
FIG. 4 is a schematic diagram illustrating a circuit for generating a gating pulse and a range bit detecting clock in the scramble check circuit of FIG. 2.

The charged flag detecting circuit 311 detects a charged flag bit for each channel with the aid of a range bit detecting clock DCK. The clock DCK is generated by a NAND gate NG2 that receives clocks A1–A3 through inverters N16–N18, clocks A4 and A5 through inverters N9 and N10, and clocks CK15 and A0, as shown in FIG. 4. The NAND gate NG2 becomes logic "high" only when each column period of the received frame data of FIG. 1A or FIG. 1B is in a range bit position. An 8-bit shift register SR1 has its clear terminal connected to a supply voltage and its input terminal connected to the frame data. Moreover, the clock terminal thereof is connected to the range bit detecting clock DCK. Thus the shift register SR1 shifts data for the range bits of the frame data received by the clock DCK and generates charged flag bits FD for a corresponding channel at every eighth clock DCK.

The bit clock generating circuit 312 generates the first to fourth bit clocks BCK1-BCK4 at first to fourth channel periods, respectively, by decoding a clock CK10 corresponding to one frame period and a clock CK9 corresponding to two frame periods. Means for generating the first bit clock BCK1 include a first inverter N1, a second inverter N2, and AND gates AG1 and AG5. The clock CK9 is applied through the first inverter N1 to one of two inputs of the first AND gate AG1, while the clock CK10 is applied through the second inverter N2 to the other input of the AND gate AG1. The AND gate AG1 generates "high" signals after a first channel period. Accordingly, the AND gate AG1 establishes the output period for the first bit clock BCK1. The output of the AND gate AG1 and a clock CK15 are applied to two inputs of the fifth AND gate AG5. The AND gate AG5 generates the first bit clock BCK1 by passing the clock CK15 at the first channel period. Means for generating the second bit clock BCK2 include a third inverter N3, and AND gates AG2 and AG6. One of two inputs of the second AND gate AG2 receives the clock CK9 and the other input thereof receives the clock CK10 through the third inverter N3. The AND gate AG2 establishes the output period for the second bit clock BCK2. The output of the AND gate AG2 and the clock CK15 are connected to two inputs of the sixth AND gate AG6, and the AND gate AG6 generates the second bit clock BCK2 by passing the clock CK15 at a second channel period. Means for generating the third bit clock BCK3 include a fourth inverter N4, and AND gates AG3 and AG7. The clock CK9 is also applied to one of two inputs of the third AND gate AG3 through the fourth inverter N4, and the clock CK10 is applied to the other input of the AND gate AG3. The AND gate AG3 establishes the output period of the third bit clock BCK3. The output of the AND gate AG3 and the clock CK15 are applied to two inputs of the seventh AND gate AG7. The AND gate AG7 generates the third bit clock BCK3 by passing the clock CK15 at a third channel period. Means for generating the fourth bit clock BCK4 include AND gate AG4 and AG8. The clocks CK9 and CK10 are also applied to two inputs of the fourth AND gate AG4. The AND gate AG4 establishes the output period of the forth bit clock BCK4. The output of the AND gate AG4 and the clock CK15 are applied as inputs to the eighth AND gate AG8. The AND gate AG8 generates the fourth bit clock BCK4 by passing the clock CK15 at a fourth channel period. Accordingly, the bit clock generating circuit 312 establishes the first to fourth channel periods by quartering the clocks CK9 and CK10. The received clock CK15 generates the first to fourth bit clocks BCK1–BCK4 at corresponding channel periods.

The charged flag latch circuit 313 receives the output of the shift register SR1 as the data input and receives the first to fourth bit clocks BCK1–BCK4 as clock inputs, to sequentially latch the detected charged flags of each channel at corresponding periods given by the first to fourth bit clocks BCK1–BCK4. A first latch DF1, with the data input connected to the output of the shift register SR1 and the clock input connected to the first bit clock BCK1, latches the charged flag FD detected at the first channel period as a first charged flag LFD1. A second latch DF2 having the data input connected to the output of the shift register SR1 and the clock input connected to the second bit clock BCK2 latches the charged flag FD detected at the second channel period as a second charged flag LFD2. A third latch DF3 having the data input connected to the output of the shift register SR1 and the clock input connected to the third bit clock BCK3 latches the charged flag FD detected at the third channel period as a third charged flag LFD3. A fourth latch DF4 with the data input connected to the output of the shift register SR1 and the clock input connected to the fourth bit clock BCK4 latches the charged flag FD detected at the fourth channel period as a fourth charged flag LFD4.

The gating period determining circuit 314 receives a gating pulse GP at the start time of each frame and generates a gating signal GAT for a given period. As indicated in FIG. 4, the gating pulse GP is generated by a NAND gate NG1 receiving clocks A4–A10 through inverters N9–N15. The gating pulse GP is a pulse signal indicating the start time for receiving data for each frame. The gating pulse GP is applied as the data input to a fifth latch DF5, and a clock A3 is applied as the clock input to the latch DF5. The output of the latch DF5 generates the gating signal GAT through a fifth inverter N5. The gating signal GAT is a signal which permits the charged flags detected in a previous frame to be accumulated at the start time for detecting the charged flags of the next frame.

The gating circuit 315 receives the outputs of the charged flag latch circuit 313 and the gating period determining circuit 314 and produces the logical values of the charged flags detected in the previous frame. A ninth AND gate AG9 receives the output of the latch DF1 and the gating signal GAT to gate the first charged flag LFD1. A tenth AND gate AG10 receives the output of the latch DF2 and the gating signal GAT to gate the second charged flag LFD2. An eleventh AND gate AG11 receives the output of the latch DF3 and the gating signal GAT to gate the third charged flag LFD3, while a twelfth AND gate AG12 receives the output of the latch DF4 and the gating signal GAT to gate the fourth charged flag LFD4.

In the multiframe signal generating circuit 330, a clock A10 for a frame period is connected to the clock input of a hexadecimal counter BC1 through a sixth inverter N6. The counter BC1 counts the outputs from the inverter N6 and generates a carry output signal CO when the count of the outputs of the inverter N6 reaches sixteen. The output of the inverter N6 is also applied to the data input of a sixth latch DF6 and a clock A9 is applied to the clock input of the latch DF6. The sixth latch DF6 outputs a signal synchronized with the clock A9. A thirteenth AND gate AG13 receiving the carry output signal CO and the output of the latch DF6 generates a first multiframe signal $\overline{MFCK}$. The first multiframe signal $\overline{MFCK}$ is inverted by a seventh inverter N7, to generate a second multiframe signal $\overline{MFCK}$. Therefore, the multiple frame signal generating circuit 330 establishes a judging period for determining the charged flag bits which is 16 frames in length.

The scramble determining circuit 350 includes a determining circuit 351, a determining signal latch circuit 352 and a mode select circuit 353.

The determining circuit 351 including the second to fifth shift registers SR2–SR5 receives the first to fourth charged flags LFD1–LFD4 generated from the gating circuit 315 and the second multiframe signal $\overline{MFCK}$. It checks the logical state of the charged flags of each channel for each 16-frame period. When the charged flags exceeding a given number are detected, the audio data is judged to be scrambled data and the determining circuit 351 generates a mute signal. A second 8-bit shift register SR2 having the clock input connected to the first charged flag LFD1 and the clear input connected to the second multiframe signal $\overline{MFCK}$ generates the mute signal when 8 or more first charged flags are detected during a 16-frame period. Third and fourth 8-bit shift registers SR3 and SR4, with their clock inputs connected to the second and third charged flags LFD2 and LFD3, respectively, and their clear inputs connected to the second multiframe signal $\overline{MFCK}$, generate the mute signal when the second and third charged flags are 8 or more in number during the 16-frame period. Moreover, a fifth 8-bit shift register SR5 receiving the fourth charged flag LFD4 through the clock input and the second multiframe signal $\overline{MFCK}$ through the clear input generates the mute signal when 8 or more fourth charged flags are detected during the 16-frame period.

The determining signal latch circuit 352 including the seventh to tenth latches DF7–DF10 receives each determining signal from the shift registers SR2–SR5 as the data input and the first multiframe signal $\overline{MFCK}$ as the clock input, and latches the logical value of the charged flags of each channel detected at the generating time of the first multiframe signal $\overline{MFCK}$. The seventh to tenth latches DF7–DF10 have their data inputs connected to the outputs of the shift registers SR2–SR5, respectively, and the clock inputs commonly connected to the first multiple frame signal $\overline{MFCK}$. The seventh to tenth latches DF7–DF10 generate the first to tenth determining signals SCF1–SCF4, respectively.

The mode select circuit 353, including the inverter N8 and two AND gates AG15, AG16, receives the outputs of the latches DF9 and DF10 and a mode select signal A/B. The circuit 353 eliminates the charged flag determining signals of the third and fourth channels CH3 and CH4 whenever the B mode is selected. The AND gate AG15 receives the output of the latch DF9 and the output of the inverter N8 and eliminates the third determining signal SCF3 generated by the latch DF9 when the B mode is selected. Similarly, the AND gate AG16 receives the output of the latch DF10 and the output of the inverter N9 and eliminates the third determining signal SCF4 generated by the latch DF10 when the B mode is selected.

The operation according to the present invention will now be described specifically with reference to the timing charts of FIGS. 5A, 5B, 6A, 6B, 7A, 7B and 8.

The frequencies of the clocks A1–A10 and C6–CK10 generated by the timing control circuit 202 of FIG. 2 are shown in the following Table 1.

TABLE 1

| CLOCK | FREQUENCY | 64-BIT DE-LAY CLOCK | NOTE |
| --- | --- | --- | --- |
| −A1 | 2,048 MHz | | one bit period |
| A0 | 1,024 MHz | | |
| A1 | 512 Khz | | |
| A2 | 256 KHz | | |
| A3 | 128 KHz | | |
| A4 | 64 KHz | | |
| A5 | 32 KHz | | |
| A6 | 16 KHz | C6 | one column period |
| A7 | 8 KHz | C7 | |
| A8 | 4 KHz | C8 | |
| A9 | 2 KHz | CK9 | |
| A10 | 1 KHz | CK10 | one frame period |

Figure 5A:
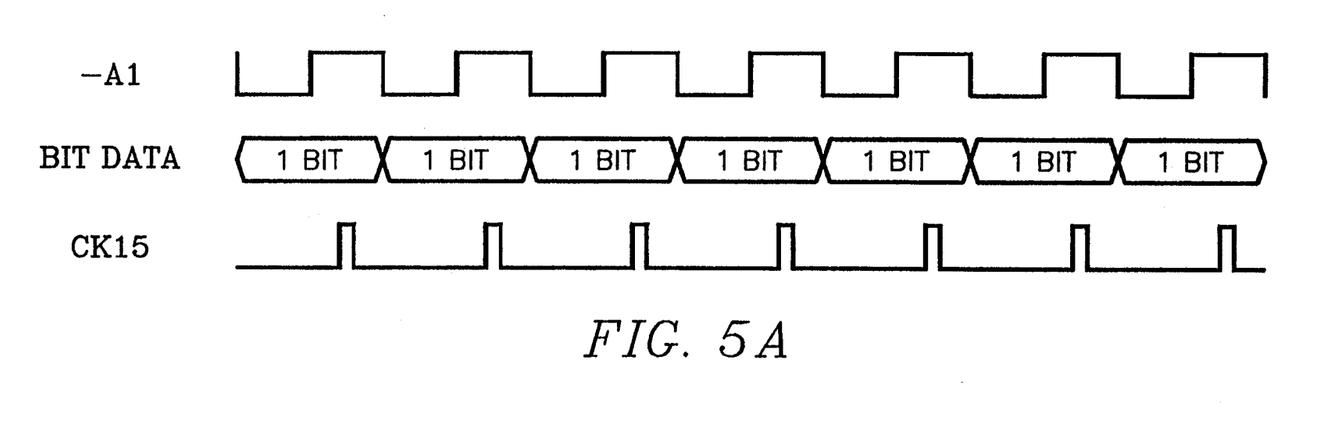
FIGS. 5A and 5B show timing charts for generating the bit clocks of FIG. 3.
Figure 5B:
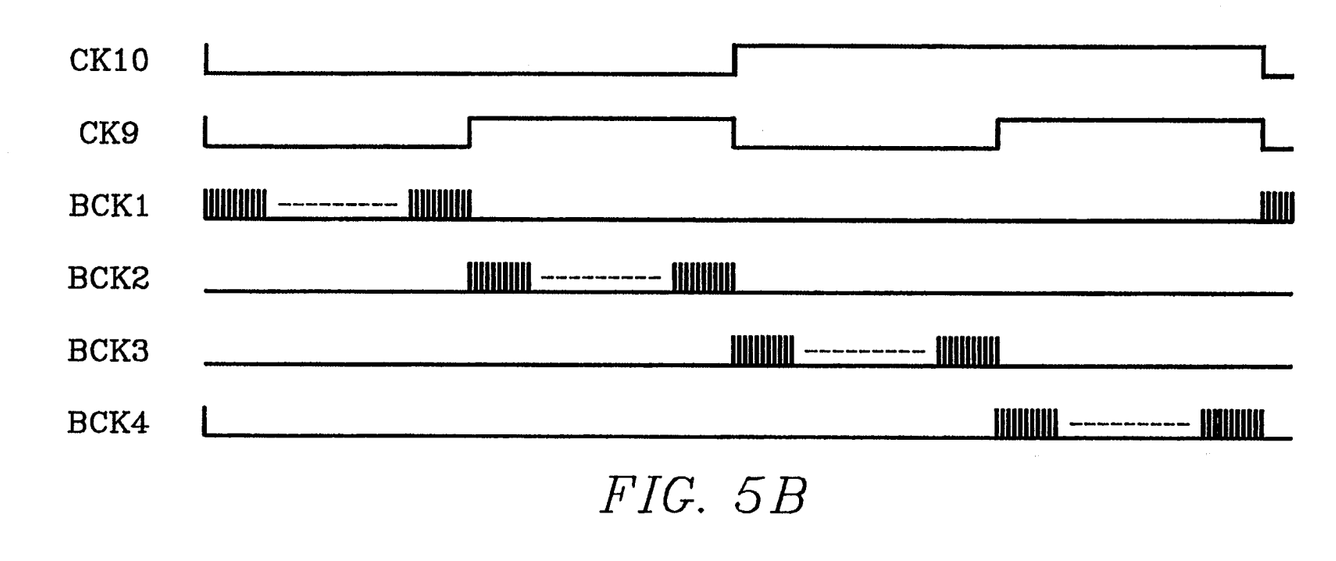

As indicated in Table 1, it will be appreciated that the number of bits of data of one frame transmitted with 2,048 Mbps is 2,048 and a one frame period is 1 ms. FIG. 5A illustrates the relationship between the received bit data and the clock CK15. The frequency of one bit data is 2,048 MHz and the bit clock CK15 generated from the timing control circuit 202 is set to logic "high" at the latter part of a one bit period. FIG. 5B shows timing charts for generating the first to fourth bit clocks BCK1–BCK4 at the first to fourth channel periods by decoding the clocks CK10 and CK9 in the bit clock generating circuit 312.

Figure 6A:
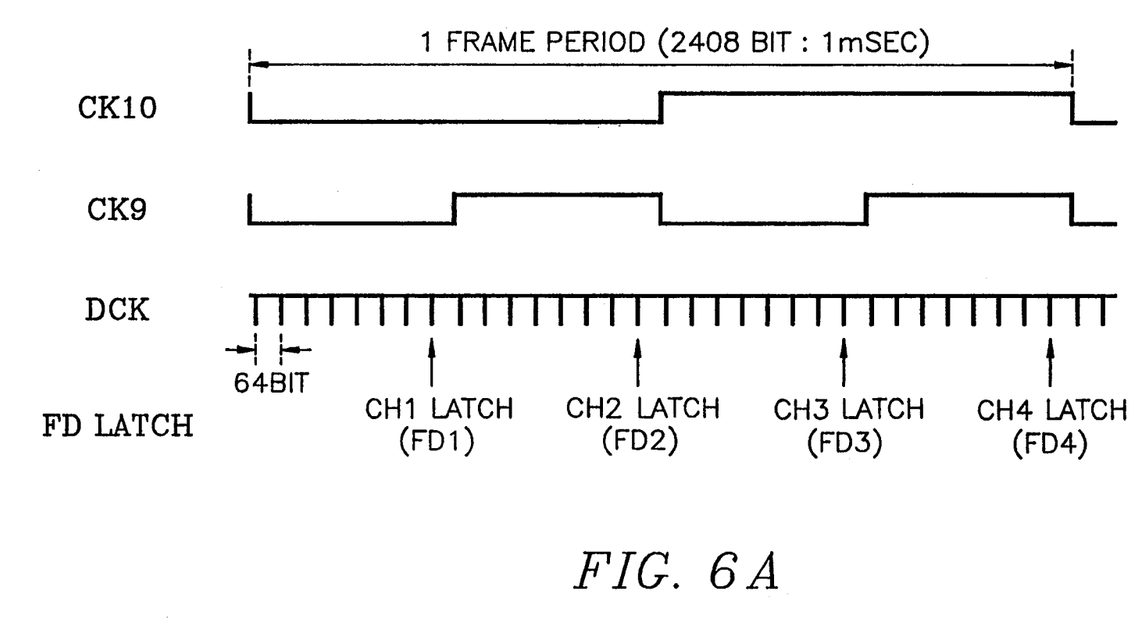
FIGS. 6A and 6B show timing charts for generating the column data clock and the gating signal of FIG. 3.

FIG. 6A shows timing charts for latching the charged flag FD of the MSB among the range bits after the range bits are detected in the frame data means of the range bit detecting clock DCK in the charged flag detecting circuit 311.

Figure 6B:
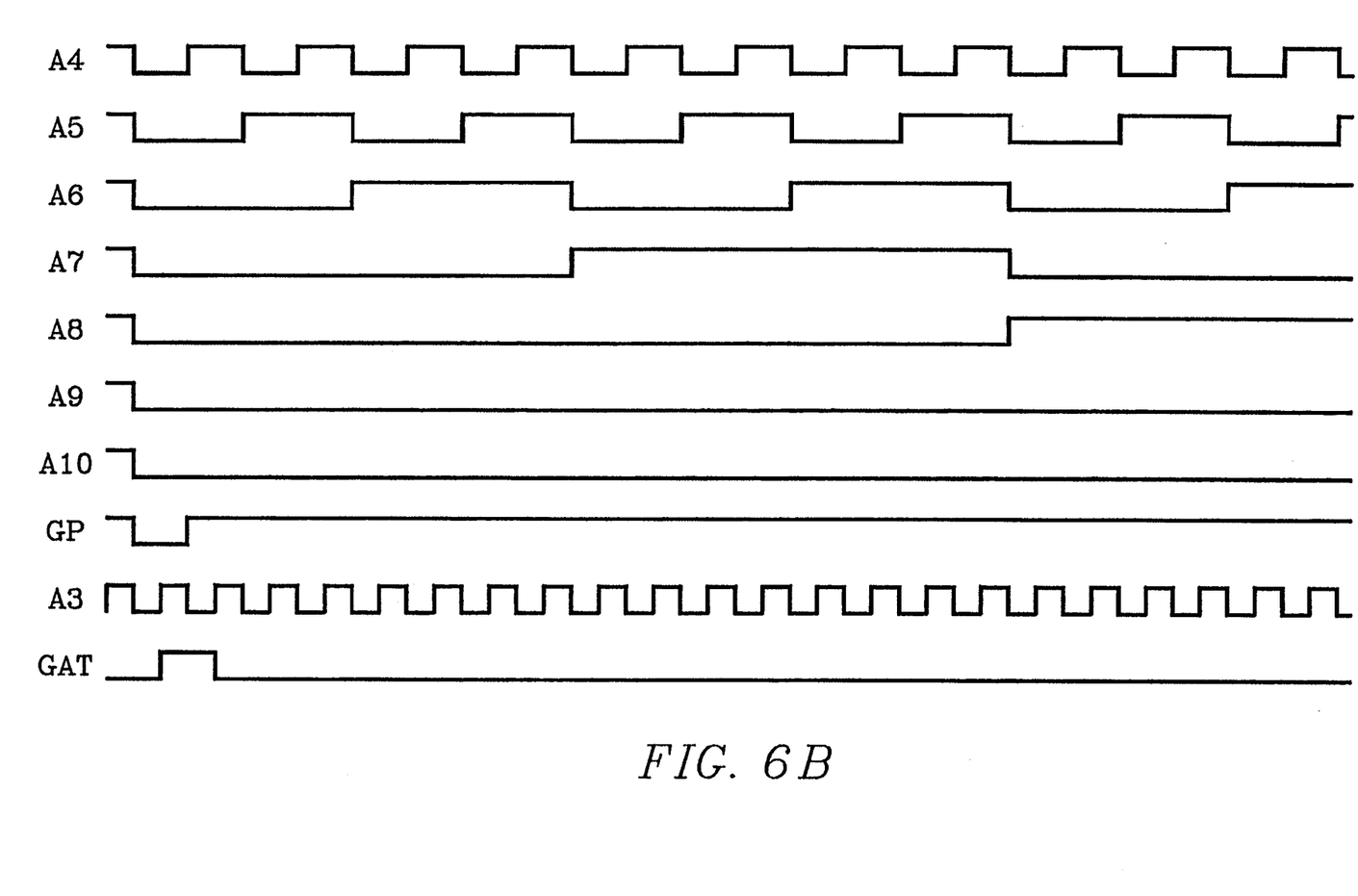

FIG. 6B shows timing charts for generating the gating signal GAT to simultaneously produce the charged flags FD1–FD4 of each channel at the start time of each frame in the gating period determining circuit 314.

Figure 7A:
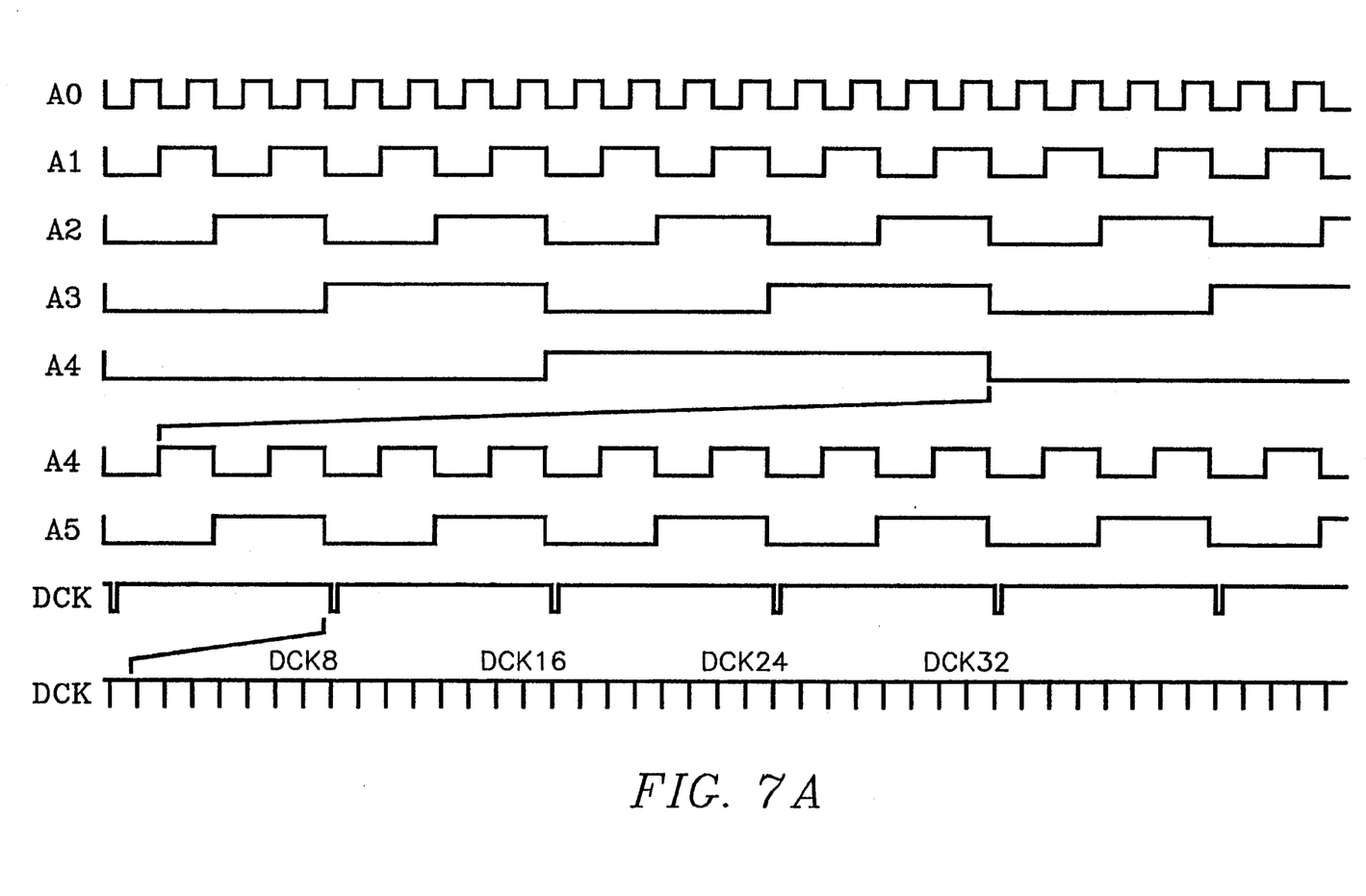
FIGS. 7A and 7B show timing charts illustrating processes for detecting a charged flag.
Figure 7B:
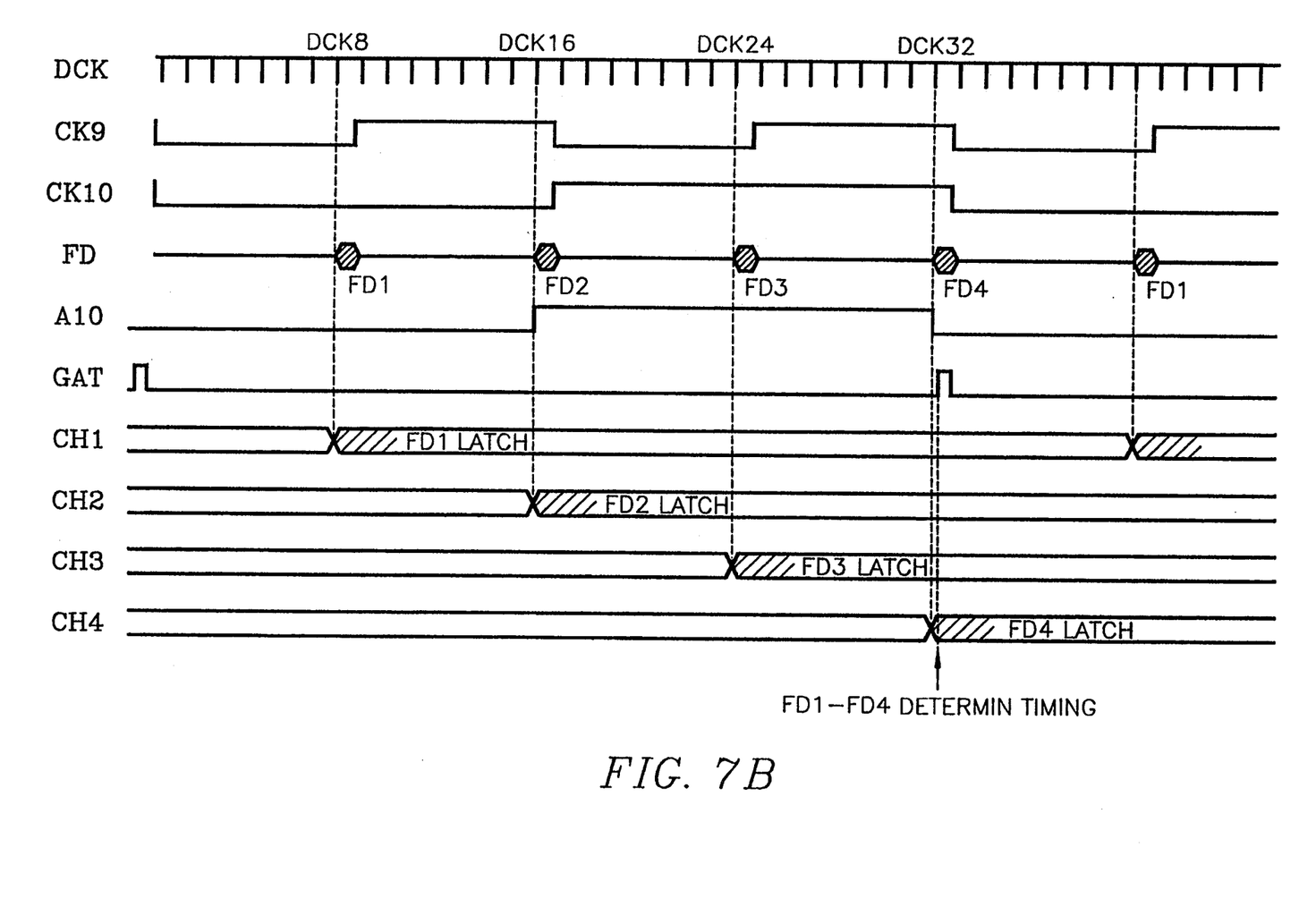

FIGS. 7A and 7B show processes for detecting the charged flags LFD1–LFD4 of the channels CH1–CH4 at one-frame periods in the charged flag latch circuit 313.

Figure 8:
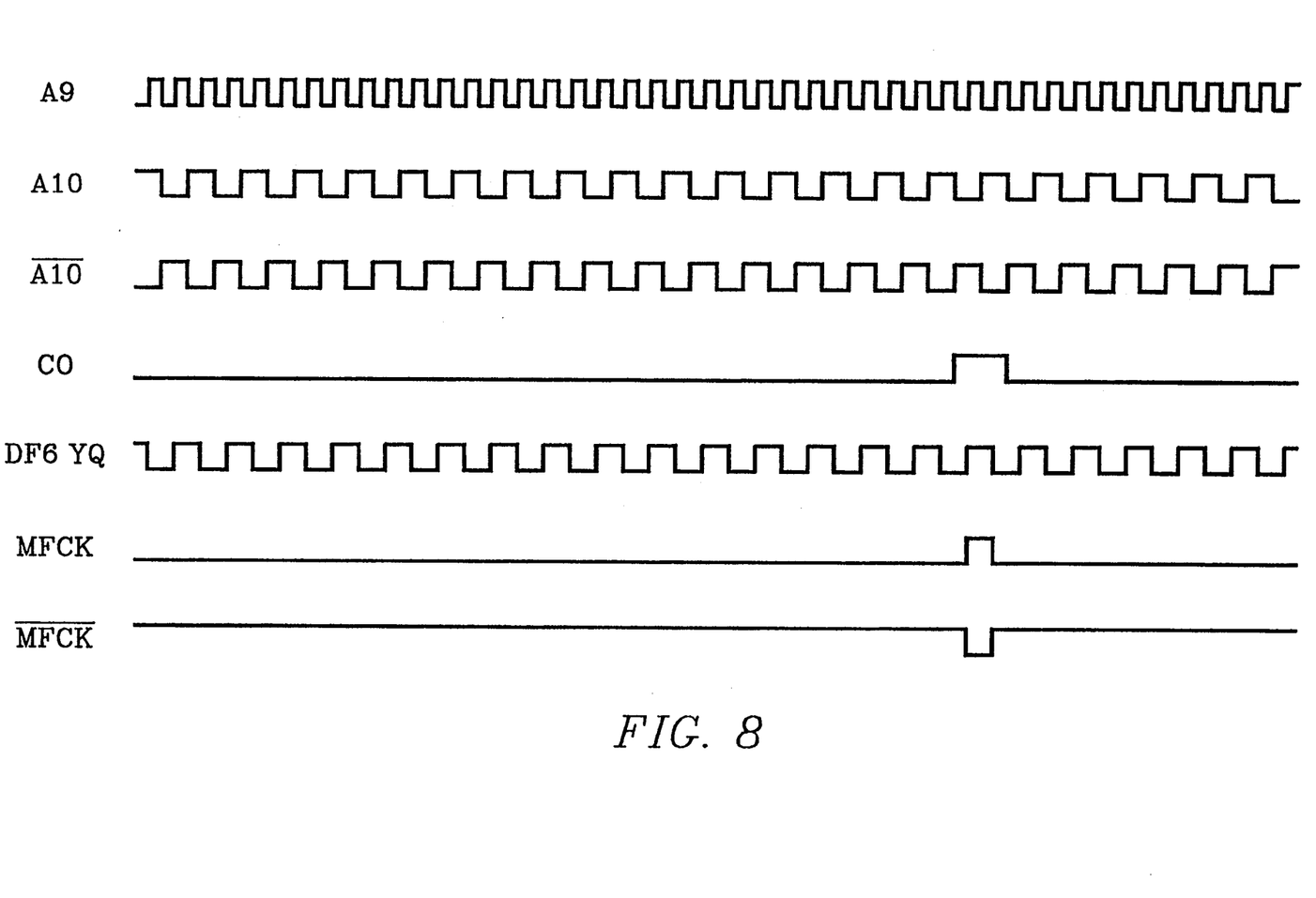
FIG. 8 show timing charts illustrating processes for checking presence/absence of scramble.

FIG. 8 shows processes for generating the multiframe signals $\overline{MFCK}$ and C for determining the presence or absence of scramble by checking the charged flags LFD1–LFD4 of each channel after each 16-frame period in the multiframe signal generating circuit 330.

When transmitting the frame data shown in FIGS. 1A or 1B, a transmitting location should indicate whether the data is scrambled or not by placing the MSB of the range bits of each channel in a set or reset state. Hence, the MSB of the range bit is a charged flag representing either the presence or absence of scrambling. Since the range bit is inserted, one bit by one bit, in each frame of data, consisting of 32 columns, the charged flag bit is contained in the 8th, 16th, 24th and 32and columns. Therefore, the decoding device of the satellite broadcasting receiver detects an appropriate bit in the 8th, 16th, 24th and 32nd columns at a range bit position in each frame of data and determines the logical state of the detected charged flag bit every frame period. If charged flag bits for over 8 frames are detected in a 16-frame period, the corresponding data is determined to be scrambled data and the audio signal is muted as a result. In this case, it is assumed that if the charged flag is in a set state ("1"), the data is scrambled data and if it is in a reset state ("0"), the data is unscrambled data. The frame data from the BCH circuit 205 [BCH (63,56)] of FIG. 2 is applied to the data input of the shift register SR1. The shift register SR1 shifts data received in accordance with the range bit detecting clock DCK. The range bit detecting clock DCK is obtained from the NAND gate NG2, which receives clocks A1–A5 through the inverters N16–N18, N9, N10, respectively, and clocks CK15, A0, as shown in FIG. 4. In case A5–A1 are "00001" the range bit detecting clock DCK is generated as the clock CK15. Therefore, the range bit detecting clock DCK is generated at a range bit position of the frame data shown in FIG. 1A or 1B with respect to 32 columns, and the clock DCK becomes the period of 64 bits data. The timing chart of the range bit detecting clock DCK is shown in FIG. 7A. Since the shift register SR1 has its clock input receiving the range bit detecting clock DCK and its data input receiving frame data, the shift register SR1 sequentially receives and then shifts respective range bits contained in the frame data in accordance with the range bit detecting clock DCK. Further, when 8 range bit detecting clocks are received, the shift register SR1 generates the stored range bits in parallel. Consequently, whenever 8 range bit detecting clocks DCK are received, the shift register SR1 produces the charged flags FD of the MSB through the output terminal Y0.

The charged flags of each channel generated by the shift register SR1 differ in their output timing. Therefore, the logic state of the detected charged flags FD should be judged by temporarily storing and simultaneously generating the charged flags FD of each channel detected at one-frame periods. For this purpose, after decoding one frame period, the charged flags FD detected for that period are latched. As shown in FIG. 5A, the clock CK15 generated by the timing control circuit 202 is set to a "high" state at a fifth period obtained by equally dividing data of one bit by 6. Moreover, as shown in FIG. 5B, the charged flag detected at each channel period is divided by 4 periods so as to be latched by decoding the clocks CK10 and CK9 through the inverters N1–N4 and AND gates AG1–AG4. The AND gates AG5–AG8 receiving the outputs of the AND gates AG1–AG4 and the clock input CK15 generate the first to fourth bit clocks BCK1–BCK4 as shown in FIG. 5B. The processes for generating the first to fourth bit clocks BCK1–BCK4 in bit clock generating circuit 312 are presented in Table 2.

TABLE 2

| CK10 | CK9 | AG1–AG4 | AG5–AG8 | |
| --- | --- | --- | --- | --- |
| 0 | 0 | AG1 → 1 | AG5 → CK15 output | BCK1 output |

TABLE 2-continued

| CK10 | CK9 | AG1–AG4 | AG5–AG8 | | |
|---|---|---|---|---|---|
| | | AG2–AG4 → 0 | AG6–AG8 → 0 | | at CH1 period |
| 0 | 1 | AG2 → 1 | AG6 → CK15 output | BCK2 output | |
| | | AG1, AG3, AG3 → 0 | AG5, AG7, AG8 → 0 | | at CH2 period |
| 1 | 0 | AG3 → 1 | AG7 → CK15 output | BCK3 output | |
| | | AG1, AG2, AG4 → 0 | AG5, AG6, AG8 → 0 | | at CH3 period |
| 1 | 1 | AG4 → 1 | AG8 → CK15 output | BCK4 output | |
| | | AG1–AG3 → 0 | AG5–AG7 → 0 | | at CH4 period |

The first to fourth bit clocks BCK1–BCK4 sequentially generated at periods for the first to fourth channels CH1–CH4 are applied to the clock inputs of the latches DF1–DF4 of the charged flag latch circuit 313. The data inputs of the latches DF1–DF4 are connected to the output terminal Y0 of the shift register SR1. Hence the latches DF1–DF4 latch the charged flags FD of each channel in accordance with the first to fourth bit clocks BCK1–BCK4 indicated in FIG. 5B, as shown in FIG. 6A. That is, the latches DF1–DF4 receive the charges flags generated from the shift register SR1. Since, however, the output timing of a corresponding latch is determined by the first to fourth bit clocks BCK1–BCK4, the latches DF1–DF4 latch the charged flags FD of a designated channel every frame period as represented in Table 3.

TABLE 3

| LATCH | DATA INPUT | CLOCK INPUT | OUTPUT |
|---|---|---|---|
| DF1 | SR1 output | BCK1 | LFD1 |
| DF2 | SR1 output | BCK2 | LFD2 |
| DF3 | SR1 output | BCK3 | LFD3 |
| DF4 | SR1 output | BCK4 | LFD4 |

However, since the charged flags of each channel have different detecting times in the one frame period, the output timing of the charged flags LFD1–LFD4 must be adjusted so as to check all flags at one given time each frame. It is desirable to adjust the output timing of the charged flags LFD1–LFD4 after the charged flag LFD4 of the last channel is detected. Thus the gating pulse GP is generated by the NAND gate NG1 receiving the clocks A4–A10 through the inverters N9–N15 as shown in FIG. 4. When the clocks A10–A0 become "0000 000 XXXX" the gating pulse GP is generated at a low pulse rate having a 32-bit period (a period of the clock A3:128 KHz) corresponding to half of the clock time A4 as shown in FIG. 6B. Since the gating pulse GP is generated at the same period as the generating time of the range bit detecting clock DCK, the gating pulse GP should be set to logic "high" after a given period of time to perform a gating operation. Hence, if the gating pulse GP is applied to the data input of the latch DF5, having its clock input connected to the clock A3, and a delayed gating pulse is generated from the output terminal YQ of the latch DF5 and is inverted through the inverter N5, the gating signal GAT having logic "high" is produced as shown in FIG. 6B.

The gating signal GAT is simultaneously applied to one of two inputs of the AND gates AG9–AG12. The AND gates AG9–AG12 also receive the latched charged flags LFD1–LFD4, and the moment the gating signal GAT is applied to the AND gates AG9–AG12, the AND gates AG9–AG12 gate the charged flags. Following this, the outputs of the AND gates AG9–AG12 are simultaneously applied to the clock inputs of the shift registers SR2–SR5.

Next, the processes for detecting the charged flags LFD1–LFD4 of the channels CH1–CH4 from the data of one frame are described with reference to FIGS. 7A and 7B. The moment 8 range bit detecting clocks are received, the shift register SR1 generates the charged flag FD1 of the first channel CH1 through its output terminal Y0, and the moment 16 range bit detecting clocks are applied, the shift register SR1 generates the charged flag FD2 of the second channel CH2 through its output terminal Y0. Moreover, the moment 24 range bit detecting clocks are received, the shift register SR1 generates the charged flag FD3 of the third channel CH3 through its output terminal YO, and the moment 32 range bit detecting clocks are applied, the shift register SR1 generates the charged flag FD4 of the fourth channel CH4 through its output terminal YO. In order to sequentially latch the charged flags FD1–FD4 of the channels CH1–CH4, each channel period is determined by decoding the clocks CK10 and CK9, and then the clock CK15 is generated at a corresponding period to sequentially produce the bit clocks BCK1–BCK4. In this case, each bit clock generates 512 clocks, obtained by dividing 2048 bits (the data of one frame) by 4. Hence, the latch timing of the latches DF1–DF4 is determined by the bit clocks BCK1–BCK4 and the latches DF1–DF4 latch the charged flags FD1–FD4 sequentially at the corresponding time. However, since the latch times of the charged flags FD1–FD4 are different, the latched charged flags LFD1–LFD4 detected from the entire frame are gated by generating the gating signal GAT at the start time for a subsequent frame, so that they may be simultaneously judged.

Thus the presence/absence of scramble of the received frame data is determined by checking the charged flags FD1–FD4 of each channel, detected during one frame period, at given frame period intervals. In case that the presence of scramble is determined after one frame period, since the control circuit 209 for controlling a system can not confirm whether a transmission line or equipment error produces an error in the charged flag or not, the system may be controlled incorrectly. In other words, when determining the presence/absence of scramble based solely on a single frame, defects in an audio signal may be misinterpreted and the operation of the system unstably controlled as a result. Therefore, it is desirable to accumulate the charged flags from several given frame periods, and only then determine the values of the accumulated charged flags.

In this case, the scramble determination should be stable, i.e., the determination should not be based on a single frame period. In the preferred embodiment, a 16-frame period (one frame period is 1 ms) is utilized. This 16-frame period is not noticeable by the viewer and the load of the system can be reduced. If the period is more than 16ms, an audio mute operation may be noticeable and if the period is less than 16 ms, the load on the system is increased.

Referring to FIG. 8, the processes for generating the multiframe signal $\overline{MFCK}$ are shown. The hexadecimal counter BC1 counts the clock A10 for the frame period through the inverter N6, and generates the carry signal CO when the count of the clock A10 through the inverter N6 is registered sixteen times. The carry signal CO is generated with a 16-frame period. The clock A10 is also applied through the inverter N6 to the data input of the latch DF6. The clock A9 is applied to the clock input thereof, and the output of the latch DF6 is synchronized with C9. The AND gate AG13 receiving the carry signal CO and the output of the latch DF6 generates the first multiframe signal $\overline{MFCK}$ during one frame period of the clock A9 with the 16-frame period. The first multiframe signal MFCK is inverted through the inverter N7, to generate the second multiframe signal $\overline{MFCK}$.

If the judging period is established, the shift registers SR2-SR5 receive the charged flags FD1-FD4 detected at the channels CH1-CH4 through their clock inputs and shift the charged flags. If charged flags LFD1-LFD4 of a set state (logic "1") are received, the shift registers SR2-SR5 perform a shifting operation, and if charged flags LFD1-LFD4 of a reset state (logic "0") are received, the shift registers SR2-SR5 maintain their state without the shifting operation. Therefore, the 8-bit shift registers SR2-SR5 generate logic "high" through their output terminal Y7 when the charged flags LFD1-LFD4 detected at the channels CH1-CH4 are respectively detected with 8 or more set states (logic "1"). Moreover, if 7 or less set states are detected, the shift registers SR2-SR5 generate logic "low". That is, the shift registers SR2-SR5 check the logic state of the charged flags received during the 16-frame period. If charged flags for over an 8-frame period are received with the set state, the shift registers SR2-SR5 generate the audio mute signal of logic "high", and otherwise, the shift registers SR2-SR5 generate the audio mute signal of logic "low". The shift registers SR2-SR5 are initialized by the second multiframe signal $\overline{MFCK}$ with the 16-frame period.

The outputs of the shift registers SR2-SR5 are applied to the data inputs of the latches DF7-DF10. Since the latches DF7-DF10 receive the first multiframe signal MFCK through their clock inputs, the latches DF7-DF10 latch the logical values of the charged flags determined during the 16-frame period and generate the audio mute control signals SCF1-SCF4 which are then output to the control circuit 209. The control circuit 209 receiving the audio mute control signals SCF1-SCF4 determines whether the audio signal should be muted or not. In case the frame data is in B mode, there is no audio data for the third and fourth channels CH3 and CH4. Therefore, the AND gates AG15 and AG16 generate logic "low" upon receiving an A/B mode signal and supply the logic "low" to the control circuit 209 of the system.

As described above, in the satellite broadcasting receiver, the presence/absence of scrambling is determined by checking the received data. Further, the function of the system is improved by muting the audio signal when the scrambled data is received. Furthermore, when determining whether there is scramble or not, even if the scrambled data value of a specific frame is changed due to, e.g., an error caused by transmission lines, the system can be stably controlled through its use of frame periods.

The foregoing description shows a only a preferred embodiment of the present invention. Various modifications will be apparent to those skilled in the art without departing from the scope of the present invention. Therefore, the embodiment shown and described is only illustrative, not restrictive.

What is claimed is:

1. A scramble detecting circuit in a satellite broadcast receiver for receiving and decoding frame data having a plurality of channels of pulse code modulation (PCM) audio data, determining the presence of scrambling, and muting an audio signal when scrambled data is detected, comprising:

frame charged flag detecting means for receiving frame data, for sequentially detecting certain charged flags included in the frame data of each of the plurality of channels, for simultaneously gating the detected charged flags at a channel related period and for generating a charged flag data bit for each detected changed flag for each channel for every frame period;

multiframe signal generating means for receiving a clock signal corresponding to a frame period, for counting the received clock signals, and for generating a multiframe signal corresponding to a given multiframe period; and determining means for receiving the charged flag data bits and the multiframe signal, for accumulating the charged flag data bits during the multiframe period, and for generating an audio mute signal when the number of charged flag data bits attains a predetermined value.

2. The circuit as claimed in claim 1, wherein said frame charged flag detecting means comprises:

means for receiving the frame data and sequentially detecting a logical state of the charged flags included in the frame data;

means for decoding frame period clock signals and sequentially generating bit clock signals corresponding to a channel period;

means for receiving the logical state of the charged flags as a data input and for receiving the bit clock signals as a clock input and sequentially latching the logical states of the charged flags in accordance with the bit clock signals;

means for receiving the frame period clock signals and generating a gating signal at a start time for receiving the subsequent frame data; and means for receiving the latched logical states and the gating signal and simultaneously generating the logical states for each channel in accordance with the gating signal.

3. The circuit as claimed in claim 1, wherein said determining means comprises:

means for receiving the charged flag data bits, receiving the multiframe signal as an initialized signal, accumulating the number of charged flag data bits generated, and generating a resulting signal; and means for receiving the resulting signal as a data input, receiving the multiframe signal as a clock input and generating a scramble detect signal as an audio mute signal if the resulting signal indicates the presence of scrambling.

4. The circuit as claimed in claim 1, wherein the audio mute signal is generated when the number of charged flag data bits exceeds a predetermined number.

5. A scramble detecting circuit in a satellite broadcast receiver for receiving and decoding frame data having a plurality of channels of pulse code modulated (PCM) audio data, determining the presence of scrambling, and muting an audio signal when scrambled data is detected, comprising:

a frame charged flag detector that receives frame data, that sequentially detects certain charged flags included in the frame data of each of the plurality of channels, that simultaneously gates the detected charged flags at a channel-related period and that generates a charged flag data bit for each detected charged flag for each channel for every frame period;

a multiframe signal generator that receives a clock signal corresponding to a frame period, that counts the received clock signals, and that generates a multiframe signal corresponding to a given multiframe period; and a judging unit that receives the charged flag data bits and the multiframe signal, that accumulates the charged flag data bits during the multiframe period, and that generates an audio mute signal when the number of charged flag data bits attains a predetermined value.

6. The circuit as claimed in claim 5, wherein said frame charged flag detector comprises:

a charged flag detecting circuit that receives the frame data and sequentially detects certain charged flags by their logical state;

a bit clock generating circuit that decodes clock signals, each corresponding to a frame period, and sequentially generates bit clock signals at a channel-related period;

a charged flag latch circuit that receives the detected certain charged flags as a data input and receives the bit clock signals as a clock input and sequentially latches the received charged flags in accordance with the bit clock signals;

a gating period determining circuit that receives the clock signals corresponding to the frame periods and that generates a gating signal at the receiving start time of the frame data; and a gating circuit that receives the latched charged flags and the gating signal and simultaneously outputs the latched charged flags for each channel in accordance with the gating signal.

7. The circuit as claimed in claim 5, wherein said judging unit comprises:

a determining circuit that receives the charged flag data bits, that receives the multiframe signal as an initialized signal, that accumulates the number of charged flag data bits generated, and generates a determination signal; and a determining signal latch circuit that receives the determination signal as a data input, receives the multiframe signal as a clock input and generates a scramble detect signal as an audio mute signal if the determination signal indicates the presence of scrambling.

8. A broadcast receiving method comprising the steps of:

receiving frame data having a plurality of channels of pulse-code modulated audio data;

decoding the frame data;

determining whether the audio data is scrambled by evaluating charged flags in the frame data; and muting an audio signal when the audio data is determined to be scrambled.

9. A broadcast receiving method comprising the steps of:

receiving frame data having a plurality of channels of pulse-code modulated audio data;

decoding the frame data; and determining whether the audio data is scrambled by evaluating charged flags in the frame data;

wherein said determining step comprises the steps of:

detecting certain charged flags included in the frame data;

generating a multiframe signal; and counting the detected charged flags occurring during a period defined by the multiframe signal.

10. A method according to claim 9, further comprising the step of:

muting an audio signal when the number of charged flags attains a predetermined value.

11. A method according to claim 9, wherein said detecting step comprises the steps of:

sequentially detecting certain charged flags included in the frame data of each of the plurality of channels, simultaneously gating the detected charged flags at a channel-related period and generating a charged flag data bit for each detected charged flag for each channel for every frame-related period.

12. A method according to claim 9, wherein said generating step comprises the steps of:

receiving a clock signal corresponding to a frame period, counting the received clock signals, and generating a multiframe signal corresponding to a given multiframe period.

13. A method according to claim 9, wherein said counting step comprises the steps of:

receiving the charged flag data bits and the multiframe signal, and accumulating the charged flag data bits during the multiframe period.

14. A method according to claim 9, wherein said detecting step comprises the steps of:

sequentially detecting a logical state of the charged flags for each channel included in the frame data;

decoding clock signals each corresponding to a frame period and sequentially generating bit clock signals each corresponding to a channel period;

receiving the logical state of the charged flags as a data input and receiving the bit clock signals as a clock input and sequentially latching logical states of charged flags in accordance with the bit clock signals;

receiving the clock signals corresponding to the frame periods and generating a gating signal at a start time for receiving subsequent frame data; and receiving the latched charged flag logical states and the gating signal and simultaneously generating the charged flag logical states of each channel in accordance with the gating signal.

15. A method according to claim 9 wherein said counting step comprises the steps of:

receiving the charged flag data bits, receiving the multiframe signal as an initialized signal, accumulating the number of charged flag data bits generated, and generating a resulting signal.

16. A method according to claim 15, further comprising the steps of:

receiving the resulting signal as a data input, receiving the multiframe signal as a clock input and generating a scramble detect signal as an audio mute signal if the resulting signal indicates the presence of scrambling.

* * * * *